United States Patent
Hale et al.

(10) Patent No.: US 9,892,200 B2
(45) Date of Patent: Feb. 13, 2018

(54) LOCATION-BASED AND ALTER-EGO QUERIES

(71) Applicant: eBay Inc., San Jose, CA (US)

(72) Inventors: Tyler James Hale, San Jose, CA (US);
Brian William Payne, San Jose, CA (US); Gregory Tariff, San Jose, CA (US); Veronica Souza, Atlanta, GA (US); Christopher Norman, Philadelphia, PA (US); Michael Ari Katz, Mountain View, CA (US)

(73) Assignee: eBay Inc., San Jose, CA (US)

( * ) Notice: Subject to any disclaimer, the term of this patent is extended or adjusted under 35 U.S.C. 154(b) by 335 days.

(21) Appl. No.: 14/463,432

(22) Filed: Aug. 19, 2014

(65) Prior Publication Data
US 2015/0082183 A1    Mar. 19, 2015

Related U.S. Application Data

(60) Provisional application No. 61/879,532, filed on Sep. 18, 2013.

(51) Int. Cl.
*G06F 3/00*       (2006.01)
*G06F 17/30*      (2006.01)
*G06F 3/0481*     (2013.01)
*H04W 4/02*       (2009.01)
*H04W 4/20*       (2009.01)

(52) U.S. Cl.
CPC ...... *G06F 17/30867* (2013.01); *G06F 3/0481* (2013.01); *G06F 17/3087* (2013.01); *H04W 4/02* (2013.01); *H04W 4/206* (2013.01)

(58) Field of Classification Search
CPC .......... H04L 29/0809; H04L 29/08072; G06F 17/30873; G06F 17/30899; G06F 21/31; G06F 21/50; G06Q 30/02
USPC .................................. 715/738, 741
See application file for complete search history.

(56) References Cited

U.S. PATENT DOCUMENTS

| | | | |
|---|---|---|---|
| 6,671,682 B1 * | 12/2003 | Nolte ............... | G06F 17/30867 |
| 7,890,376 B2 | 2/2011 | Barrese et al. | |
| 8,417,776 B2 * | 4/2013 | Womack ............ | G06F 21/64 |
| | | | 709/204 |
| 8,463,295 B1 * | 6/2013 | Caralis ............. | G06Q 30/0631 |
| | | | 455/414.2 |
| 8,630,960 B2 † | 1/2014 | Gross | |

(Continued)

*Primary Examiner* — Joy M Weber
(74) *Attorney, Agent, or Firm* — Shook, Hardy & Bacon L.L.P.

(57) ABSTRACT

A user at a geographical location may submit a search query and receive results responsive to the search query. The search results provided to the user may be based on the user's geographical location. The search results may also be based on one or more attributes of the user or an alter ego. The alter ego may be an individual user or another type of entity, such as a group or a business. A user at a geographical location submitting an alter-ego search query may see the results that would be presented to the alter ego if the alter ego were at the geographical location. Each user's interests may be selected through an interest-selection interface, automatically generated as the user interacts with search results, dynamically generated as a user follows or likes search results, or otherwise determined.

20 Claims, 13 Drawing Sheets

(56) References Cited

U.S. PATENT DOCUMENTS

| | | | |
|---|---|---|---|
| 2003/0220835 A1* | 11/2003 | Barnes, Jr. | G06Q 10/1053 705/14.36 |
| 2006/0020593 A1* | 1/2006 | Ramsaier | G06F 17/30867 |
| 2009/0089361 A1* | 4/2009 | Womack | G06F 21/64 709/202 |
| 2010/0198814 A1* | 8/2010 | Petersen | G06Q 10/10 707/722 |
| 2010/0205541 A1* | 8/2010 | Rapaport | G06Q 10/10 715/753 |
| 2012/0036440 A1* | 2/2012 | Dare | G06F 9/4445 715/734 |
| 2012/0221687 A1* | 8/2012 | Hunter | G06F 17/30029 709/219 |
| 2012/0239501 A1 | 9/2012 | Yankovich et al. | |
| 2013/0024471 A1 | 1/2013 | Mitrovic | |
| 2013/0110633 A1* | 5/2013 | Waldman | G01C 21/20 705/14.58 |
| 2013/0159097 A1 | 6/2013 | Schory et al. | |
| 2013/0318347 A1* | 11/2013 | Moffat | H04L 63/08 713/168 |
| 2014/0144979 A1 | 5/2014 | Lyman | |
| 2014/0156746 A1* | 6/2014 | Wheatley | H04L 67/22 709/204 |
| 2014/0214785 A1* | 7/2014 | Edberg | G06F 17/30867 707/706 |

\* cited by examiner
† cited by third party

LOCATION-BASED AND ALTER-EGO QUERIES

CLAIM OF PRIORITY UNDER 35 U.S.C. §119(e)

The application claims priority to and incorporates by reference U.S. Provisional Application No. 61/879,532, filed Sep. 18, 2013, entitled "Location-Based and Alter-Ego Queries."

TECHNICAL FIELD

The subject matter disclosed herein generally relates to the processing of data. Specifically, the present disclosure addresses systems and methods for location-based and alter-ego queries.

BACKGROUND

Search engines provide search results for users. Search results can include web pages as well as businesses or other real-world locations.

The search results may be based on query criteria submitted by a user. Query criteria can include keywords and filters.

BRIEF DESCRIPTION OF THE DRAWINGS

Some embodiments are illustrated by way of example and not limitation in the figures of the accompanying drawings.

DETAILED DESCRIPTION

Figure 1:
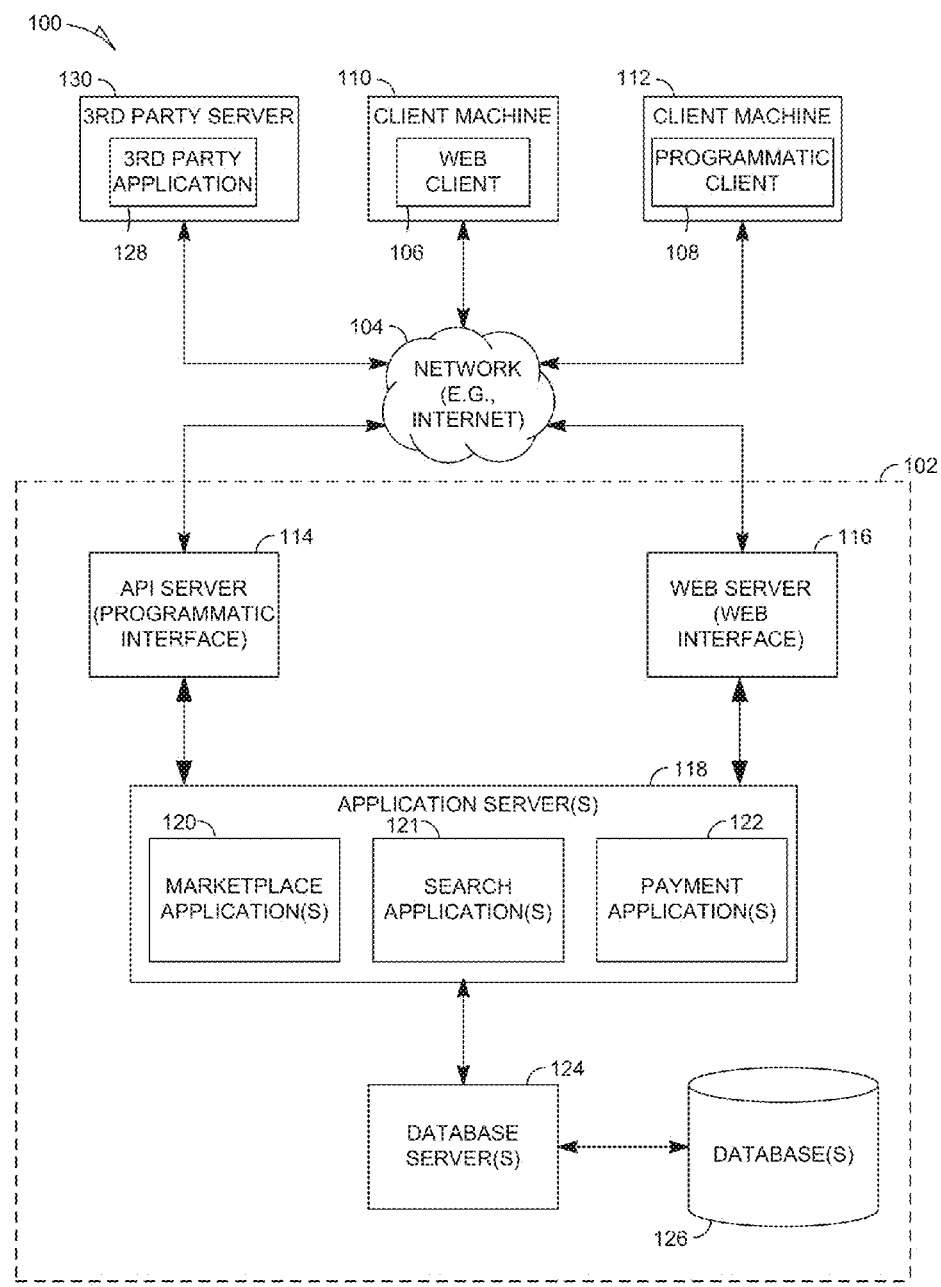
FIG. 1 is a network diagram illustrating a network environment suitable for location-based and alter-ego queries, according to some example embodiments.

Example methods and systems are directed to location-based and alter-ego queries. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user may be a user of a social network (e.g., Facebook, Twitter, LinkedIn, etc.). The user may have relationships to other users in the social network (e.g., friends). The user may have relationships with other entities in the social network (e.g., the user may be a member of a group, an employee of a company, etc.).

A user may submit a search query and receive results responsive to the search query. Each result may represent an item, event, or person. A user submitting a search query may be at a geographical location (e.g., a street address, a longitude/latitude pair, a landmark, a city, etc.). The user's geographical location may be determined by a global positioning system ("GPS") sensor associated with the user. The search results provided to the user may be based on the user's geographical location. For example, results near to the user may be prioritized over results far from the user. To illustrate, a search for "baseball team" made while the user is in San Francisco may provide results for the San Francisco Giants rather than the Miami Marlins.

In some example embodiments, geo-fences are used. A geo-fence defines a geographic area with a virtual fence. For example, a downtown shopping area may be enclosed with a geo-fence, an amusement park may be enclosed with a geo-fence, a geo-fence may divide two countries, etc. Depending on which side of the geo-fence a user is on, the results provided to the user may vary. For example, a user inside of an amusement park may receive results related to locations within the amusement park while a user outside, but near to, the amusement park may receive results related to the surrounding area rather than results related to locations inside the geo-fenced area.

A search query may be based on one or more attributes of the user. For example, a user may have identified a set of interests (e.g., a movie, a sports team, a band, a celebrity, a city, or any other item or category of items) and the search query may provide results based on the user's interests. Other attributes may also be used (e.g., age, gender, income level, education level, and so on). An alter-ego search query is a search query that is based on one or more attributes of another entity—an alter ego—rather than or in addition to the attributes of the user submitting the query. The alter ego may be an individual user or another type of entity, such as a group or a business. The alter ego may be related to the user submitting the query, such as a friend in a social network, a group to which the user belongs, etc., or unrelated to the user, such as a celebrity or a group which does not include the user as a member.

A user at a geographical location submitting an alter-ego search query may see the results that would be presented to the alter ego if the alter ego were at the geographical location. For example, a user may have an interest in cars while a celebrity chef has an interest in restaurants. The user may search for results relevant to the user's interests near the user's location and receive information about local car dealers, upcoming car shows, and the like. Alternatively, the user may issue an alter-ego search for the celebrity chef and receive results relevant to the celebrity chef's interests near the location of the user such as nearby restaurants, farmer's markets, and the like.

The alter ego may be a group to which the user belongs. The user may submit a search query that generates results based on the user's location and the group's interests. The interests of the group may be set by a group administrator, added by the members of the group (with or without review by a group administrator), submitted by members of the group subject to approval by the membership as a whole, or any suitable combination thereof.

Each user's interests may be selected through an interest-selection interface, automatically generated as the user interacts with search results, dynamically generated as a user follows or likes search results, or otherwise determined. For example, categories of interests may be presented to a user. The categories may be organized in a hierarchy the user can navigate to find individual interests. The user may select one or more interests directly for later querying. As another example, the user may submit a series of search queries and interact with the results. To illustrate, the user may search for "action movies" and receive a number of specific titles as a result. When browsing the result set, the user may choose to take a closer look at several movies starring a particular actor. The system may detect this pattern of interaction and determine that the user has an interest in the actor.

Interactions with items may include viewing items, bidding on items, buying items, subscribing to items, and sharing the items on social networks. In some example embodiments, only a subset of the interactions is considered. For example, only buying an item may be considered to be an interaction with the item. Additionally, different types of interactions may be considered in a single embodiment. To illustrate, an example embodiment may consider any form of interaction by the current user to be an interaction but consider only purchases by other users to be interactions. Thus, while the description below frequently refers to interactions, the various possible combinations of types of interactions should be recognized as being within the scope of the present invention.

In another example embodiment, interactions are grouped into categories of relevance and the categories utilized as a basis for the number of pages or results to display. An example of a category may be interactions that indicate the end of a shopping session. Interactions that may be included in such a category could include, for example, purchasing an item, performing a new search in a different item category, ending the browsing sessions, navigating to a completely different website, etc.

When search results are presented, a "like" button may be displayed with each result. Interests for a user may be determined based on results liked by the user. For example, if the user likes a number of news articles on a topic, the topic may be determined to be an interest of the user. Similarly, if the user likes a number of accessories for a product, the product may be determined to be an interest of the user. Along with (or instead of) a "like" button, a "recommend" button may be displayed with each result. Using the recommend button, the user may recommend an item. The recommendation may be made to a particular user, all friends of the user, to a group, or to another entity or set of entities. The user receiving the recommendation may have an interest generated based on receiving one or more recommendations for the item or for items in the same category as the item. In some example embodiments, the recommendation is sent in a message showing the recommendation and providing an opportunity to like or follow the recommended item or category.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or wide area network (WAN)) to one or more clients. FIG. 1 illustrates, for example, a web client 106 (e.g., a browser), and a programmatic client 108 executing on respective client machines 110 and 112.

An application program interface (API) server 114 and a web server 116 are coupled to, and provide programmatic and web interfaces respectively to, one or more application servers 118. The application servers 118 host one or more marketplace applications 120, search applications 121, and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The search applications 121 may provide a number of search functions and services to users that access the networked system 102. The search applications 121 may allow users to submit queries and receive results responsive to the queries. The search applications 121 may be linked to or part of the marketplace applications 120. Accordingly, searches may be run by the search application 121 to find items for sale through the marketplace applications 120. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace, search, and payment applications 120, 121, and 122 are shown in FIG. 1 to each form part of the networked system 102, it will be appreciated that, in alternative embodiments, the search applications 121 may form part of a search service that is separate and distinct from the networked system 102. Likewise, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, search, and payment applications 120, 121, and 122 could also be implemented as standalone software programs, which do not necessarily have networking capabilities.

The web client 106 accesses the various marketplace, search, and payment applications 120, 121, and 122 via the web interface supported by the web server 116. Similarly, the programmatic client 108 accesses the various services and functions provided by the marketplace, search, and payment applications 120, 121, and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. As another example, the programmatic client 108 may be a search application to enable users to search for items. The items searched for may be items of interest to the user, items of interest to another user, items of interest to multiple users (e.g., items of interest to both the user and another user), a combination of items of interest to different users (e.g., items of interest to the user and items of interest to another user), and so on. The items searched for may be informational items (e.g., news articles, blogs, images, multimedia content, etc.), transactional items (e.g., items for sale online, items for sale in brick-and-mortar locations, items wanted online, items wanted in brick-and-mortar locations), or other types of items.

The client machine 110 or 112 may present information to a user. For example, the client machine 110 may be running a web browser presenting a web page. The user may indicate a search query to the client machine 110. A search query defines the parameters of a search. A search query may include an alphanumeric string, an image, audiovisual data, or any suitable combination thereof. A search query may include filters that exclude results complying with or not complying with the filter. A search query may be composed of multiple elements. An element is a discrete portion of a search query, such as a word or phrase in an alphanumeric string, an image, or a filter. For example, the user may type a search query into a text field, select an item to search for similar or related items, upload an image to search for similar or related items, or any suitable combination thereof. One item is similar to another if they are substitutes for each other. For example, one television may be similar to another television. An item is related to another if they work together or are frequently purchased together. For example, peanut butter may be related to jelly, or a universal remote control may be related to a television.

The client machine 110 or 112 may submit the search query to an application server 118 running a search application 121. The application server 118 may modify the search query before submitting the modified search query to the item database (e.g., the database 126). Different modifications may be performed and the quality or quantity of the results analyzed. For example, the search query may be modified to search for results within a certain category (e.g., a product category such as books, games, movies, furniture, etc. or a content category such as news, blogs, fiction, opinion, entertainment, and the like), with a certain attribute (e.g., produced within a certain date range, located within a geographic area, shipped in a certain way, sold in a particular way, etc.), or related to a certain entity (e.g., liked by a friend, of interest to a group, sold by a company, etc.). Based on the analysis of the results, the application server 118 may send the results of one or more of the search queries back to the client machine 110 or 112.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, search, or payment functions that are supported by the relevant applications of the networked system 102.

Figure 2:
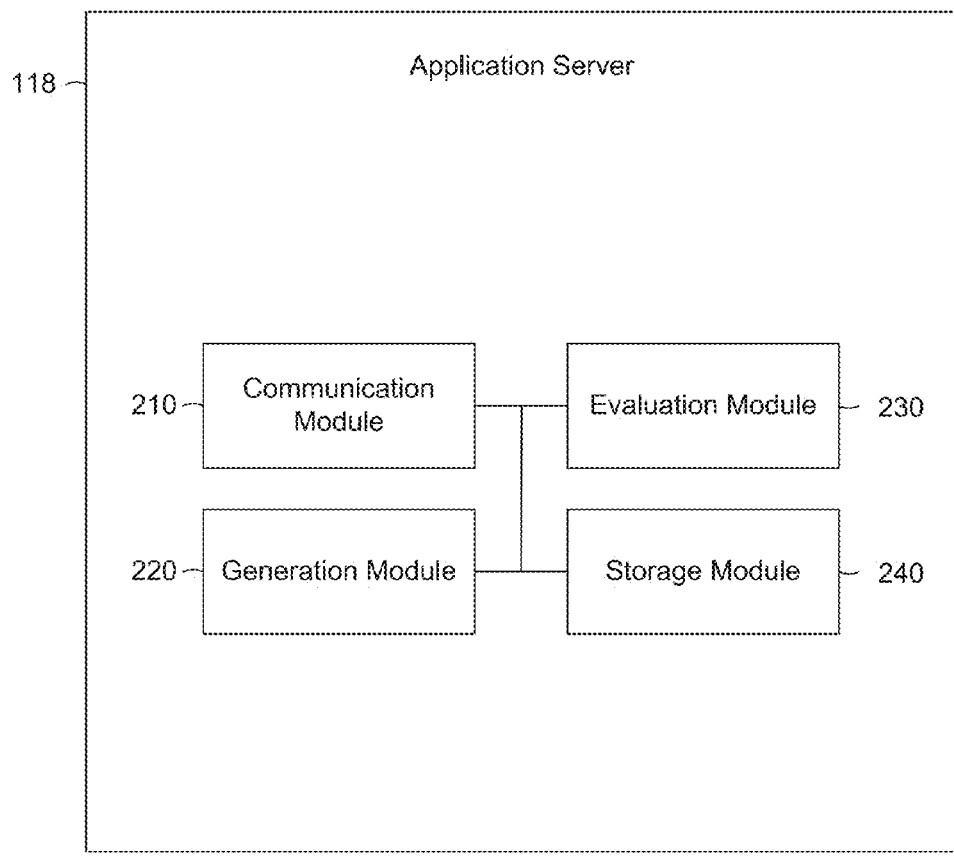
FIG. 2 is a block diagram illustrating components of an application server suitable for location-based and alter-ego queries, according to some example embodiments.

FIG. 2 is a block diagram illustrating components of an application server 118 running a search application 121, according to some example embodiments. The application server 118 is shown as including a communication module 210, a generation module 220, an evaluation module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 may control communication with the client machine 110 and the database 126. The communication module 210 may also send data for storage on the application server 118 or the database 126.

The communication module 210 may receive a search query from the client machine 110 or 112. Upon receiving a search query, the communication module 210 may send the search query to the generation module 220 to generate a refined search query. For example, the search query received may be a query for items of interest to the user that are local to the user. This received query may or may not indicate the interests of the user.

The generation module 220 may generate a refined search query based on the search query received from the client machine 110 or 112. For example, if the received search query merely indicates that the user's interests are to be used without specifying the user's interests, the generation module 220 may use the storage module 240 to retrieve a list of interests associated with the user.

The generation module 220 may also retrieve a location associated with the user from the storage module 240, or a location of the user may be communicated from the client machine 110 or 112 to the generation module 220 via the communication module 210. For example, the user may set a preferred location (e.g., a home address, a work address, or a vacation destination) as a preference, and the preferred location may be used as the user location by the generation module 220. As another example, the client machine 110 or 112 may have a built-in GPS sensor, and the location of the client machine 110 or 112 may be transmitted to the application server 118 along with the query.

The search query received from the user may be a query for items local to the querying user that are of interest to an alter ego. In response to this query, the generation module 220 may use the storage module 240 to retrieve a list of interests associated with the alter ego. The alter ego may be a friend of the querying user, a group associated with the querying user (e.g., a group to which the querying user belongs or a company by which the querying user is employed), another user unrelated to the querying user (e.g., a celebrity or subject-matter expert), a group with which the querying user is not affiliated (e.g., a club for which the user is a non-member), and the like.

A user may be presented with an option to allow others to perform (or to prevent others from performing) alter-ego searches based on the user. For example, a user that values privacy may determine that only friends may use them for an alter-ego search, while another user that seeks to gain followers may determine that any user may use them for an alter-ego search. The location of the querying user may be determined as discussed above.

As another example, the search query received may be a query for items of general interest that are local to the querying user. For example, the querying user may be a tourist who is curious about local stores, events, or tourist attractions near the tourist's current location even when the tourist has not previously identified an interest that encompasses the local item. Responsive items may be selected based on public reviews of locations (e.g. Yelp! or Google reviews), interactions of other users with nearby items, advertising payments, popular interests among all users, popular interests among friends of the user, and the like. For example, the top five most popular interests among all users may be used.

Descriptions of local items presented to the querying user may be items for sale. For example, a user with an interest in remote-controlled cars may be near a hobby store that sells such cars. Information about one or more of the remote-control cars available for purchase at the hobby store may be presented as a local result relevant to the user's interests. Along with the information about the item for sale in the hobby store, information about online purchases of the item may also be presented. For example, an auction in an online marketplace of the same or a similar item may be presented. Similarly, a user that is interested in a particular band may be near a venue that will be hosting the band later that week. Information about the upcoming concert and how to buy tickets locally may be presented to the user. Additionally, information about online sales of the concert tickets may be presented.

The generation module 220 may submit one or more of the generated queries to the evaluation module 230 for processing. The evaluation module 230 may use the Milo API to search for local results, the eBay Enterprise platform to search for local results, or search any other result database that includes location information. The result database may include location data gathered from multiple sources. The communication module 210 may send the results provided by the evaluation module 230 for the resulting query or queries to the client machine 110 or 112 for display to the user.

Though this document generally refers to the "display" of information, the presentation of results to the user may be an audio presentation. For example, the names of important monuments or upcoming events may be read aloud to the user. As another example, a user may be exploring a zoo, amusement park, museum, fair, or the like, and receive an audio presentation providing information about the exhibit or attraction nearest the user.

Figure 3:
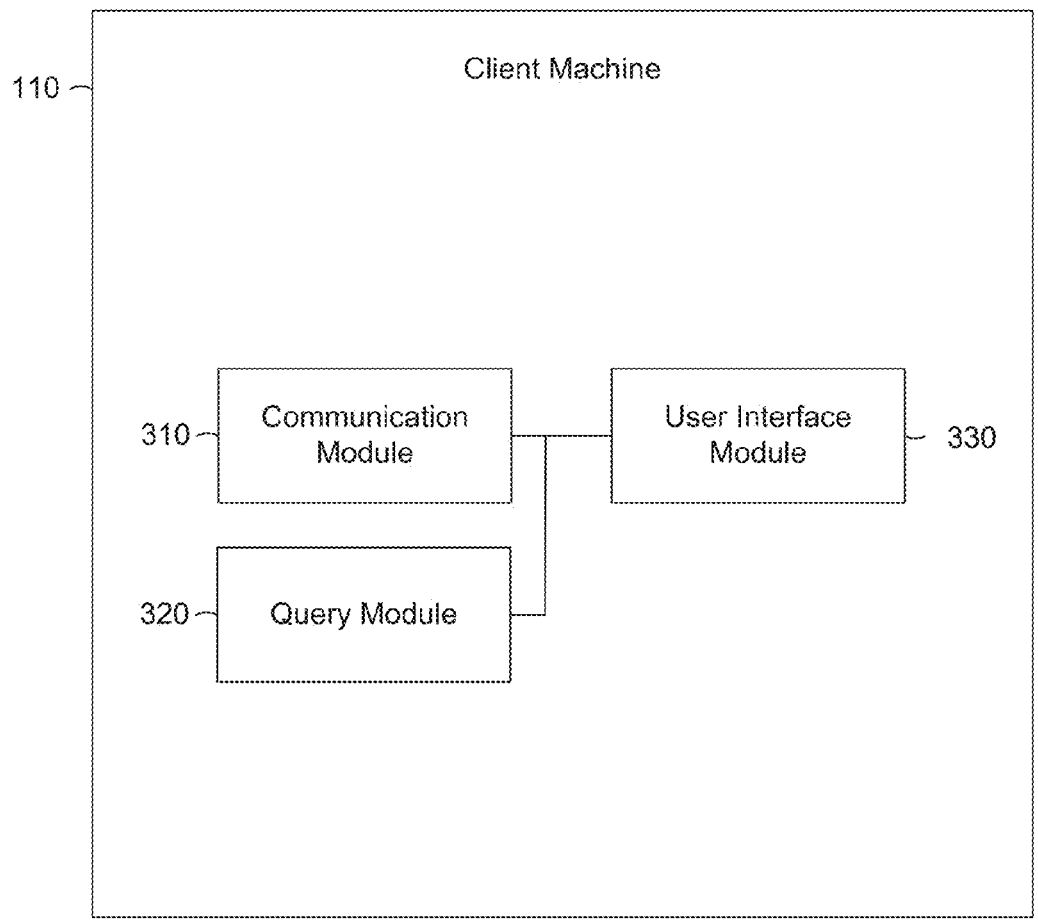
FIG. 3 is a block diagram illustrating components of a client machine suitable for location-based and alter-ego queries, according to some example embodiments.

FIG. 3 is a block diagram illustrating components of a client machine 110 or 112 suitable for location-based and alter-ego queries, according to some example embodiments. The client machine 110 or 112 is shown as including a communication module 310, a query module 320, and a user interface module 330, configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 may communicate with the application server 118, the network 104, or any suitable combination thereof. Information received via the communication module 310 may be presented (e.g., displayed on a display device or played on an audio device) via the user interface module 330. Information may be selected or search queries may be entered by a user using a user interface presented by the user interface module 330. The search queries may be communicated to the application server 118 via the communication module 310. The application server 118 may respond to the search queries with a set of results, received by the communication module 310. Search results generated by the application server 118 may be received by the communication module 310 and presented to the user by the user interface module 330. For example, the search results may be presented in a list view or a gallery view.

The user may indicate that a search query should be generated based on the interests of an alter ego and the location of the user submitting the query. This indication may be received by the user interface module 330 and the corresponding query generated by the query module 320. For example, the user may request to see results near the user that correspond to a friend's pre-selected interests.

The query module 320 may identify the user's current location and the friend's interests, and generate an appropriate query. The generated query may be transmitted to the application server 118 by the communication module 310 for processing. In other example embodiments, the request to generate a search query based on the alter ego's interests and the user's current location is transmitted to the application server 118, and query generation based on the request is performed by the application server 118.

The user interface module 330 may present a result feed that is updated as time passes or the client machine 110 or 112 is moved. For example, every thirty seconds the current location of the client machine 110 or 112 may be checked and a new set of local results generated. The result feed may be based on a single selected user or combine results from multiple users or alter egos. Alter egos to be included in the feed may be selected by the use of a "Follow" button. The "Follow" button may be presented when a user is being viewed (e.g., on a user profile page), when an item is displayed, etc. The effect of following a user may be different from the effect of following an item. For example, following a user may result in items relevant to that user's interests appearing in the result feed. By contrast, following an item may indicate an interest in the item and may result in similar items appearing in the result feed.

An item or interest that gains many followers in a short period of time may be "hot." Similarly, an item with high unit or dollar value sales may be "hot." Likewise, an item that experiences a sudden uptick in sales may be "hot." A hot item or interest may be recommended to other users. For example, a hot item may appear in a user's result feed even when it is not responsive to the user's interests. This may provide the user an opportunity to follow an item that wouldn't otherwise be seen. As another example, the item or interest may be presented in a separate user interface element, to inform the user of its "hot" status.

The user interface module 330 may present a "Trail" interface that shows the same items shown to another user previously at the user's location. For example, a first user may tour a downtown area and receive a feed of items of interest (e.g., items of general interest or items of interest to the first user). During the first user's tour, the first user may tag presented items (e.g. to share them on a social network or to follow them as discussed above). A second user may then access the path followed by the first user, and choose to follow the same path. Using the "Trail" interface, the second user may see the same items at the same locations they were viewed by the first user. The second user may also be able to see which items were tagged by the first user. The trail interface may include a map showing the path taken by the first user. The trail interface may facilitate the providing of virtual tours or provide a celebrity the opportunity to share an experience with fans. The tagging of items may be facilitated by storing an association between the item and the tagging user in the database 126 for access by the search application 121.

Figure 4:
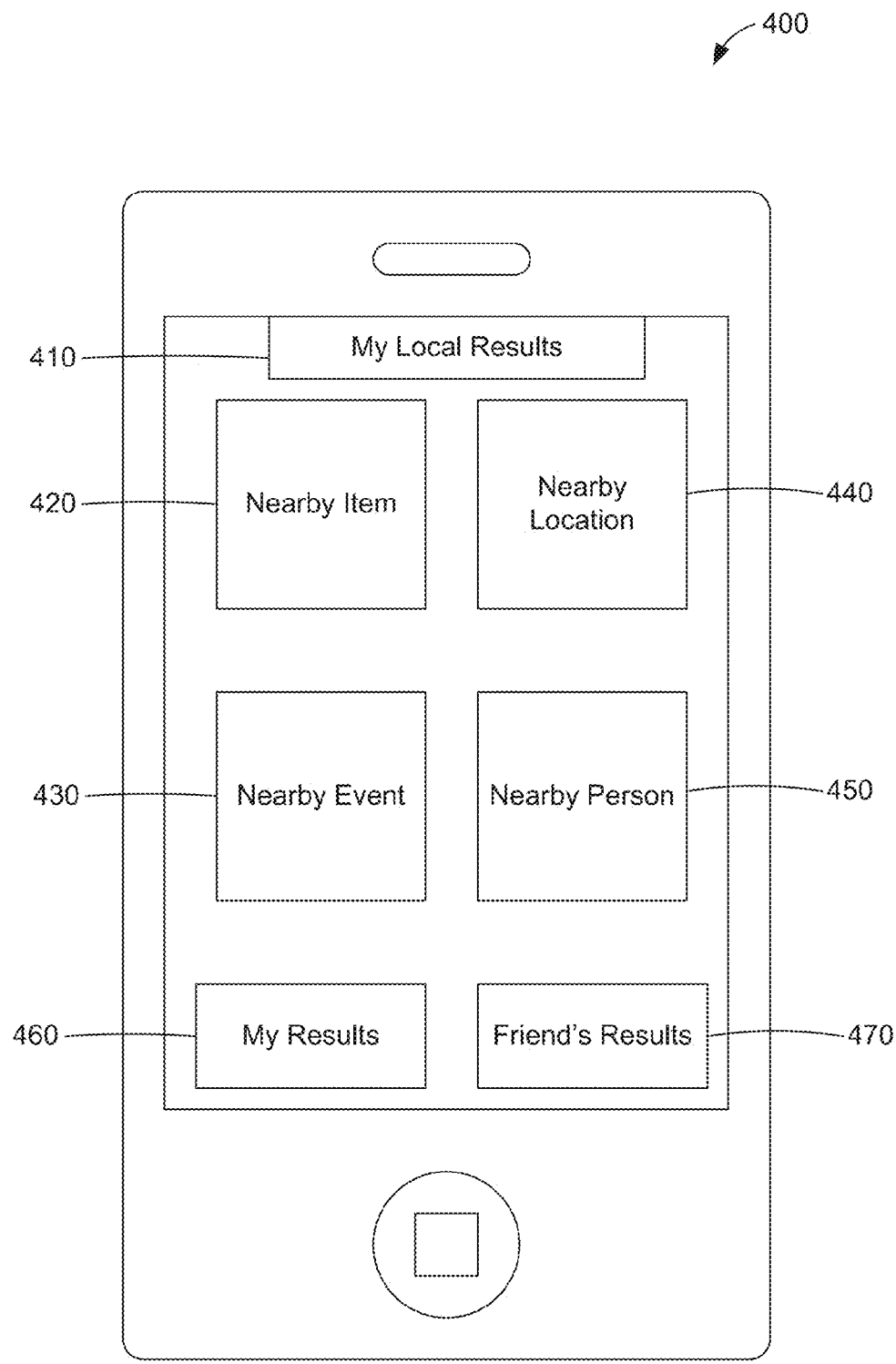
FIG. 4 is a block diagram illustrating user interfaces suitable for location-based and alter-ego queries, according to some example embodiments.

FIG. 4 is a block diagram 400 illustrating a user interface suitable for location-based and alter-ego queries, according to some example embodiments. As can be seen in block diagram 400, the user interface includes a title 410, results 420-450, and buttons 460 and 470. The title 410 shows that the screen is titled "My Local Results." The buttons 460 and 470, labeled "My Results" and "Friend's Results," respectively, may be operable to change the results presented based on corresponding search options.

The results 420-450 may include items, events, locations, people, and so on. One or more nearby items (e.g., the nearby item result 420) may be displayed in response to the query, indicating items for sale that are near to the user. For example, a store near the user may have an item for sale that corresponds to the user's interests. Nearby items may also indicate items that are wanted for purchase. For example, a coin shop or a pawn shop may be interested in purchasing items from the user. One or more nearby events (e.g., the nearby event result 430) may be displayed in response to the query, indicating events that are near to the user, such as concerts, festivals, movies, sporting events, and the like. One or more nearby locations (e.g., the nearby location result 440) may be displayed in response to the query, indicating locations that are near to the user, such as monuments, stores, gas stations, restaurants, stadiums, and other locations of interest. One or more nearby people (e.g., the nearby person result 450) may be displayed in response to the query, indicating people that are near to the user, such as friends of the user, celebrities, and other people of interest. In some example embodiments, one or more of the items, events, locations, and people displayed is chosen based on an advertising fee paid.

The button 460 may be operable to submit a search query for items responsive to the user's preselected interests that are also near to the user (e.g., within 100 yards, within 1 mile, in the same city as the user, etc.). The button 470 may be operable to submit a search query for items responsive to the friend's preselected interests that are also near to the user (e.g., within 100 yards, within 1 mile, in the same city as the user, etc.). For example, the user interface module 330 may detect the operation of the button 460. Responsive to the detection of the operation of the button 460, the query module 340 may submit a search query for results corresponding to items corresponding to the user's interests that are within the predetermined distance from the user's current location.

The distance used for the location-based and alter-ego query may be set by the user as a user option, set by the alter ego as an option (e.g., by a user or group administrator), determined based on user data (e.g., data for the user performing the search, the alter ego upon which the search is based, or both), determined based on device data (e.g., the location of the device or the velocity of the device), or any suitable combination. For example, the user may choose to see all results within 1 mile of the user's current location. The distance may be determined based on the density of results near to the device. For example, in a city center, the distance may be limited to a few blocks, either based on the location of the device or a large number of results near the device. By contrast, in the country side, the distance may be dozens of miles, either based on the location of the device or a low number of results near the device. Similarly, if the device has been moving at a velocity under 4 MPH for a period of time, it may be deduced that the user is travelling by foot, and the distance limited to walking distance (e.g., a mile). By contrast, if the device has been moving at a velocity exceeding 30 MPH for a period of time, it may be deduced that the user is driving, and the distance increased (e.g., to 10 miles).

Figure 5:
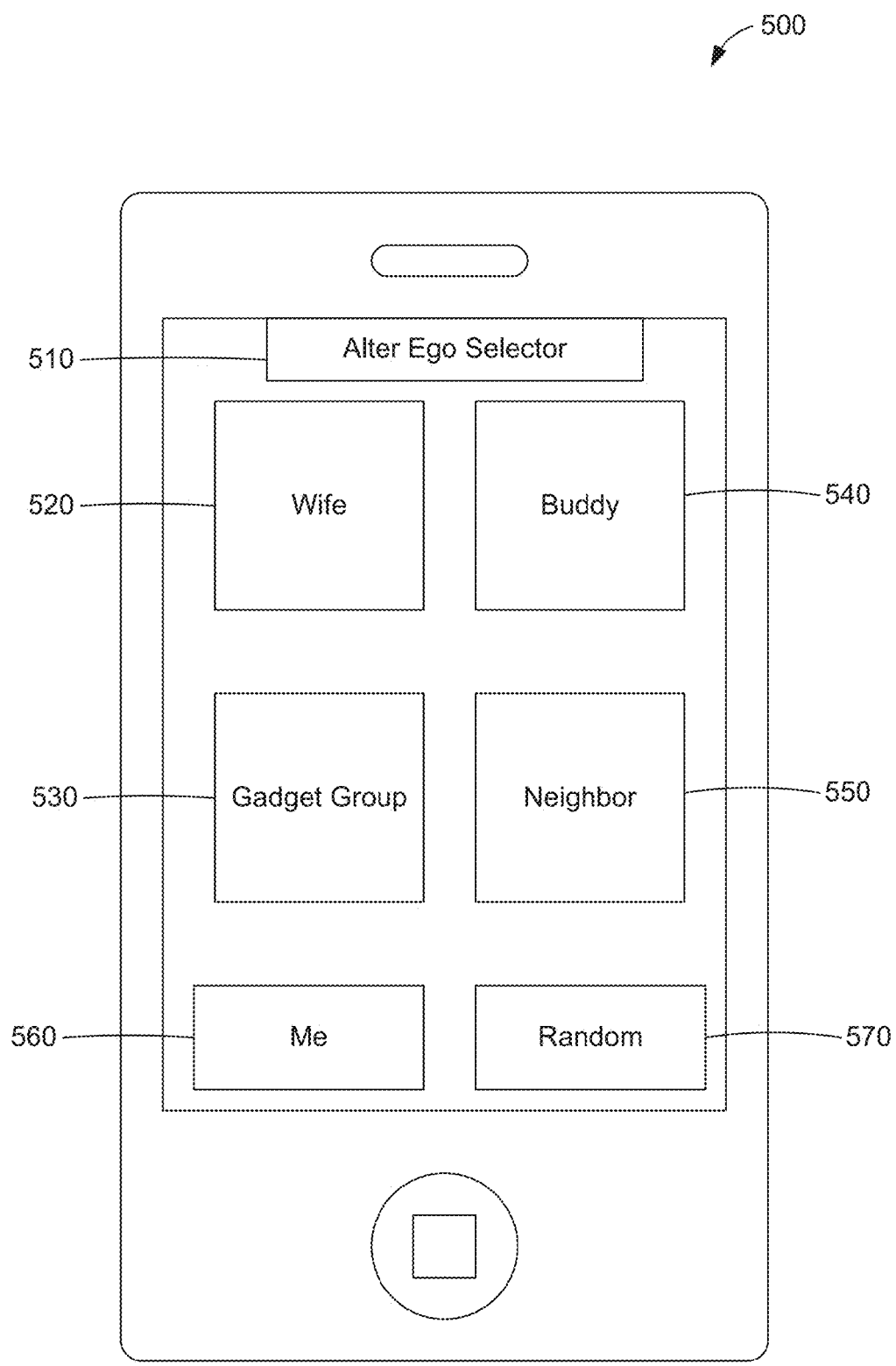
FIG. 5 is a block diagram illustrating user interfaces suitable for location-based and alter-ego queries, according to some example embodiments.

FIG. 5 is a block diagram 500 illustrating a user interface suitable for location-based and alter-ego queries, according to some example embodiments. The UI of FIG. 5 may be presented in response to the use of the button 470 of FIG. 4. Alternatively, the UI of FIG. 5 may be presented before the presentation of the UI of FIG. 4. As can be seen in block diagram 500, the user interface includes a title 510 and indicators 520-570. The title 510 shows that the screen is titled "Alter Ego Selector." The indicators 520-570 may each be operable to select an alter ego for use in the UI of FIG. 4. The indicators 520-570 may be implemented as buttons that respond to user selection (e.g., by a click or touch). Alternatively, the indicators 520-570 may be implemented as options in a drop-down menu or using another user interface paradigm. As another alternative, the indicators 520-570 may be selected by a first user interaction and activated by a second. For example, an "OK" button may be presented, operable to cause the alter ego search to proceed with the alter ego corresponding to an already-selected indicator 520-570.

The indicators 520-560 each correspond to an alter ego that may be used for location-based and alter-ego queries. For example, the indicators 520, 540, and 550, labeled "wife," "buddy," and "neighbor," respectively, may correspond to friends of the user on a social network. The button 560, labeled "me," may correspond to the user. The indicator 530, labeled "gadget group," may correspond to a group to which the user belongs. The indicator 570, labeled "random," may be operable to cause the selection of a random user or group from the selections available to the user or from the selections available to the system. For example, a user may be allowed to deliberately select only users that are part of the user's social network, but able to randomly access any user on the social network.

The users and groups presented as alter ego options in indicators 520-550 may be automatically selected for the user. For example, the users and groups with which the user has had the largest number of interactions with over a period of time (e.g., the past week, the past month, and so on) may be presented. As another example, the users and groups that have the largest number of search results near the user may be presented. For example, if the user is currently in a theater district, a friend in the social network with an affinity for theaters may be presented as an option. Similarly, a friend with no interests that generate nearby search results may be excluded from presentation to the user.

Alternatively, the users and groups presented as alter ego options in indicators 520-550 may be preselected by the user. For example, another screen may be presented with a complete list of available users and groups. From that screen, the user may select one or more users or groups to be presented as alter ego options in the UI of FIG. 5.

The UI of FIG. 5 may be presented in response to the operation of the button 470 by the user. After the user selects one of the indicators 520-570, the user may be returned to the UI of FIG. 4, with the search results updated to reflect the selected alter ego. In an alternative flow, the UI of FIG. 5 is presented to the user as an option screen, allowing the user to preselect the desired alter ego. In this alternative flow, operation of the button 470 causes the search results of FIG. 4 to update to reflect the pre-selected alter ego.

Figure 6:
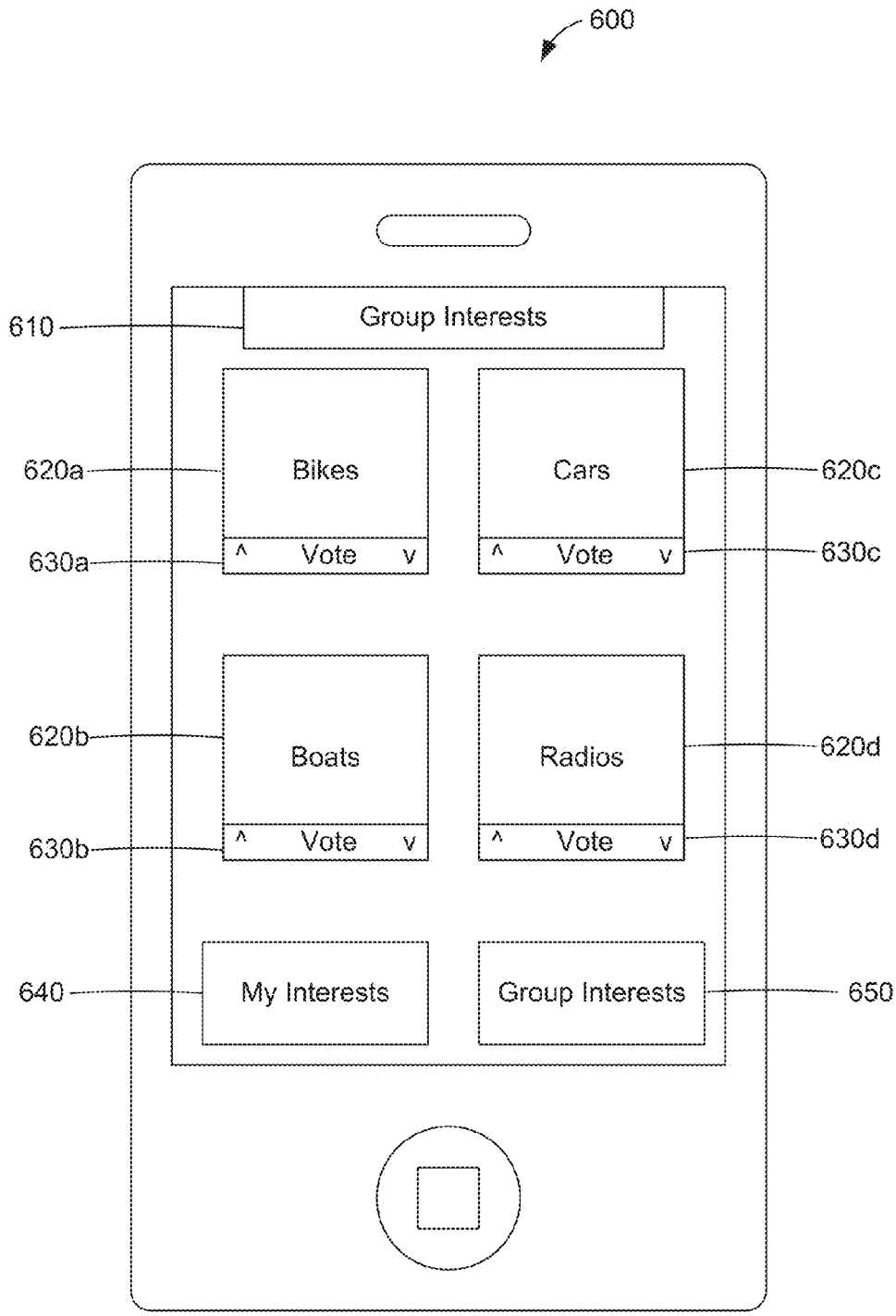
FIG. 6 is a block diagram illustrating user interfaces suitable for location-based and alter-ego queries, according to some example embodiments.

FIG. 6 is a block diagram 600 illustrating a user interface suitable for location-based and alter-ego queries, according to some example embodiments. As can be seen in block diagram 600, the user interface includes a title 610, interest indicators 620a-620d, vote buttons 630a-630d, and buttons 640 and 650. The title 610 shows that the screen is titled "Group Interests."

The button 640, labeled "My Interests," may be operable to cause the user's preselected interests to be shown. The button 650, labeled "Group Interests," may be operable to cause the group's preselected interests to be shown. One or more interest indicators 620a-620d may be displayed in response to the query, indicating categories of interest to the user or group. Along with each of the interests indicators 620a-620d displayed, a vote button 630a-630d may be shown with an up arrow and a down arrow. The arrows may be operable by the user to vote for or against a particular category, indicating that the user finds the category to be of interest to the user or the group. The votes for a group may be aggregated across the members of the group, with the most popular categories kept as group interests and the least popular categories dropped. In some example embodiments, users can propose new categories of interest for the group, to be voted on by the other members.

Figure 7:
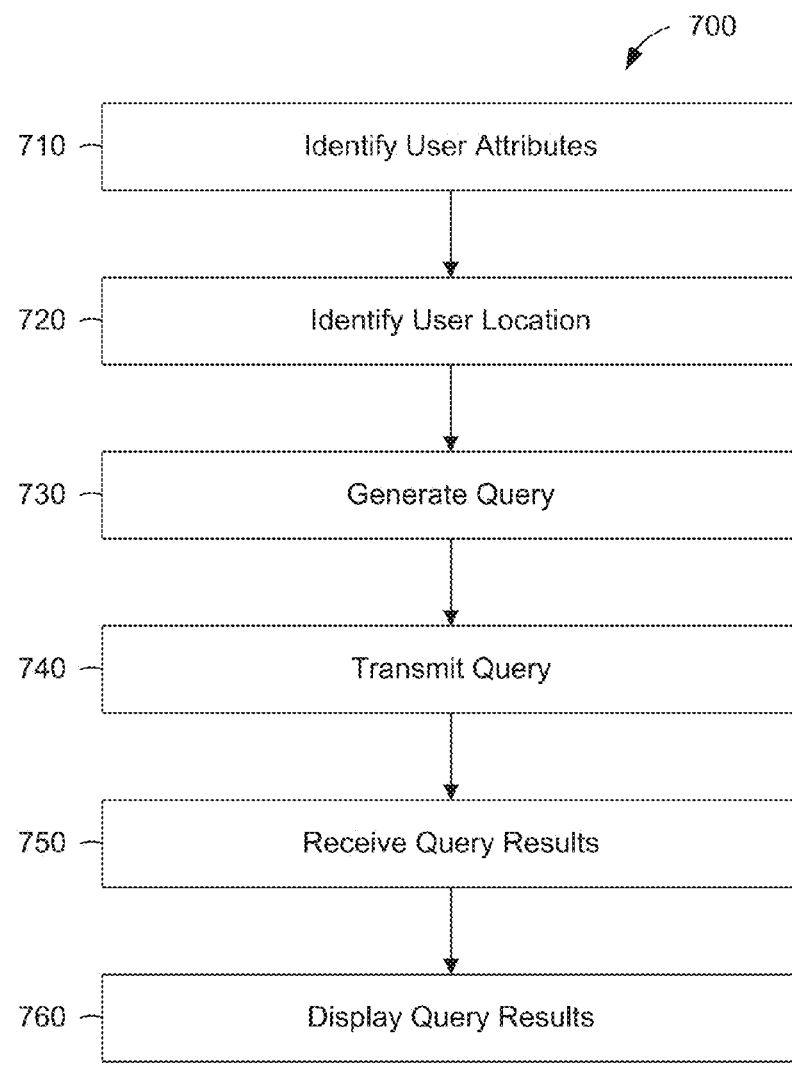
FIG. 7 is a flowchart illustrating operations of a client machine in performing a method of location-based and alter-ego queries, according to some example embodiments.

FIG. 7 is a flowchart illustrating operations of a client machine 110 or 112 in performing methods of location-based and alter-ego queries, according to some example embodiments. Operations in the method 700 may be performed by the client machine 110 or 112, using modules described above with respect to FIG. 3. As shown in FIG. 7, the method 700 includes operations 710-760.

The client machine 110 or 112 may identify user attributes (operation 710). For example, the client machine 110 or 112 may identify a set of interests associated with a user. In some example embodiments, the set of interests is automatically generated based on previous interactions by the user. In other example embodiments, the set of interests is based on explicit choices or votes by the user. The set of interests may be based on items "liked" by the user. In some example embodiments, the interests of a user may be based on the actions of other users. For example, a user may recommend an item to another user. The user receiving the recommendation may have an interest generated based on receiving one or more recommendations for the item or for items in the same category as the item. In some example embodiments, the user receives the recommendation in a message showing the recommendation and providing an opportunity to like or follow the recommended item or category.

The client machine 110 or 112 may also identify the location of the user (operation 720). In some example embodiments, the location used is the location of the client machine 110 or 112. Alternatively, the location used may be set by the user. Based on the identified attributes and location, a query may be generated (operation 730). For example, a query may be generated to find results responsive to the user's interests near the user's location. The generated query may be transmitted to an application server 118 (operation 740) running a search application 121. The application server 118 may process the query and generate one or more search results. The client machine 110 or 112 may receive the results generated by the query (operation 750) and display them to the user (operation 760).

Figure 8:
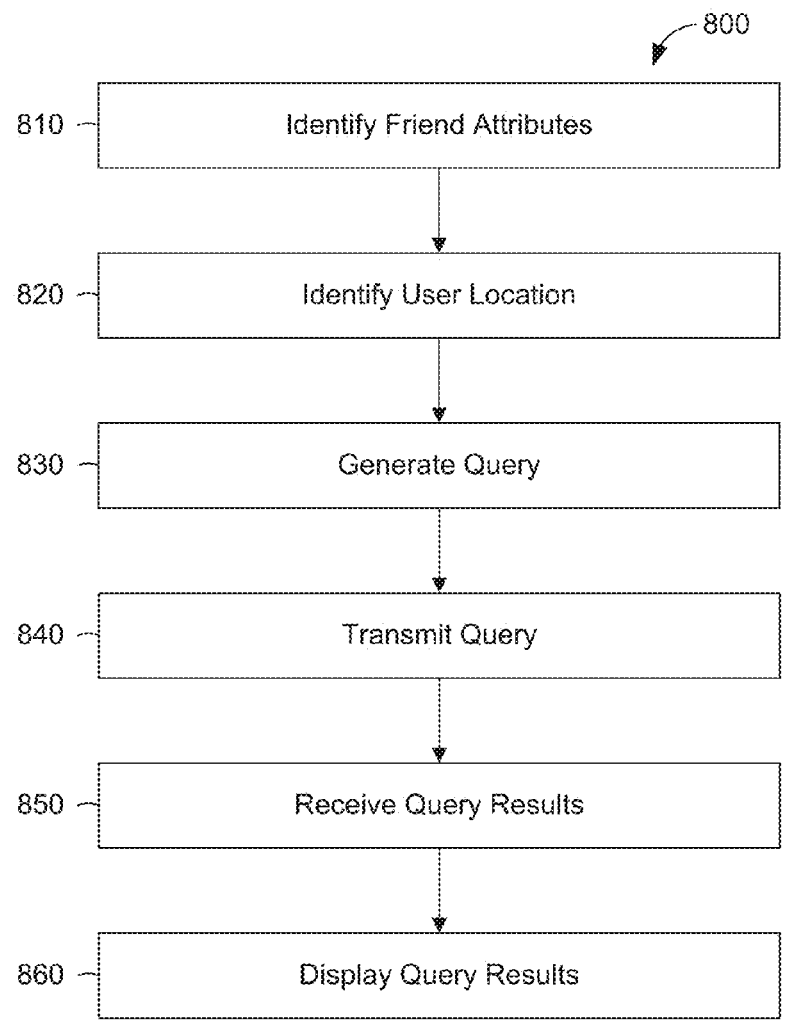
FIG. 8 is a flowchart illustrating operations of a client machine in performing a method of location-based and alter-ego queries, according to some example embodiments.

FIG. 8 is a flowchart illustrating operations of a client machine 110 or 112 in performing methods of location-based and alter-ego queries, according to some example embodiments. Operations in the method 800 may be performed by the client machine 110 or 112, using modules described above with respect to FIG. 3. As shown in FIG. 8, the method 800 includes operations 810-860.

The client machine 110 or 112 may identify attributes of an alter ego for the user of the client machine 110 or 112, such as a friend of the user (operation 810). For example, the client machine 110 or 112 may identify a set of interests associated with a friend of the user. The client machine 110 or 112 may also identify the location of the user (operation 820). The user whose location is identified may be the user currently using the client machine 110 or 112. In some example embodiments, the location used is the location of the client machine 110 or 112. Based on the identified attributes and location, a query may be generated (operation 830). For example, a query may be generated to find results responsive to the identified user interests and the location of the user of the client machine 110 or 112. The generated query may be transmitted to an application server 118 (operation 840) running a search application 121. The application server 118 may process the query and generate one or more search results. The client machine 110 or 112 may receive the results generated by the query (operation 850) and display them to the user (operation 860).

Figure 9:
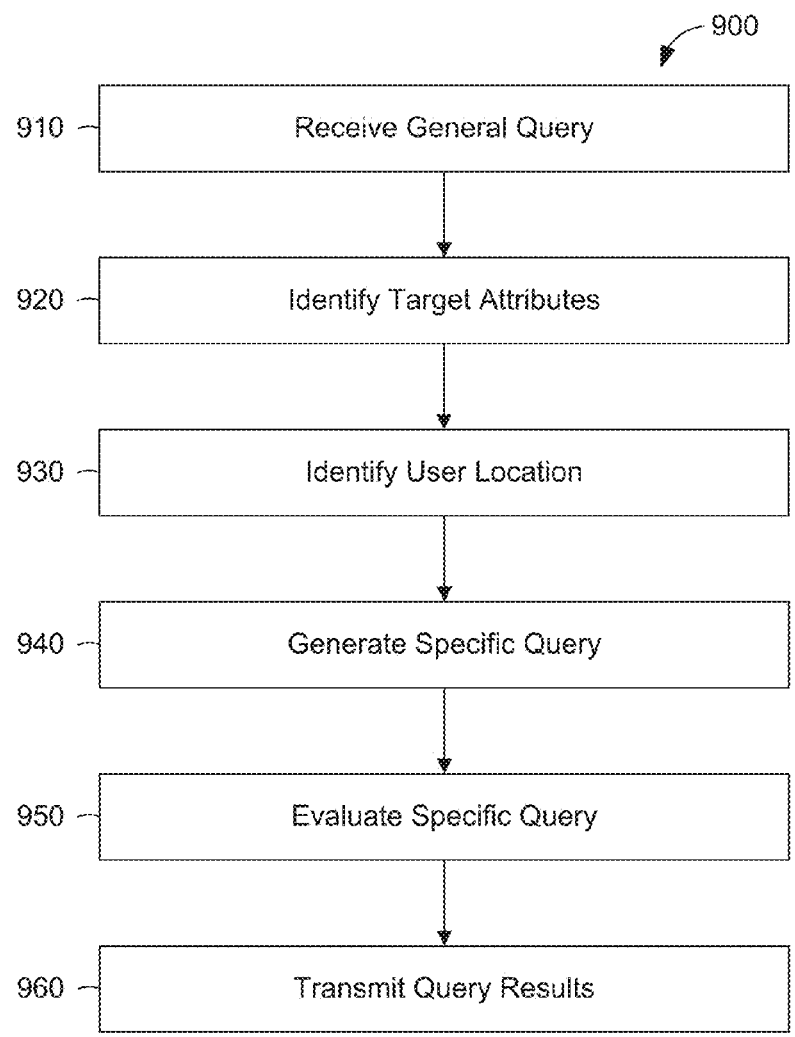
FIG. 9 is a flowchart illustrating operations of an application server in performing a method of location-based and alter-ego queries, according to some example embodiments.

FIG. 9 is a flowchart illustrating operations of an application server 118 in performing methods of location-based and alter-ego queries, according to some example embodiments. Operations in the method 900 may be performed by the application server 118 running a search application 121, using modules described above with respect to FIG. 2. As shown in FIG. 9, the method 900 includes operations 910-960.

The application server 118 may receive a general query (operation 910) from a user. For example, the query may be directed to nearby results relevant to interests of an alter ego. The client machine 110 or 112 may identify user attributes of the alter ego (operation 920). The alter ego may be a friend of the user. For example, the client machine 110 or 112 may identify a set of interests associated with the friend of the user. The client machine 110 or 112 may also identify the location of the user submitting the query (operation 930). The user whose location is identified may be the user currently using the client machine 110 or 112. In some example embodiments, the location used is the location of the client machine 110 or 112.

Based on the identified attributes and location, a specific query may be generated (operation 940). For example, a query may be generated to find results responsive to the identified alter-ego interests and the location of the user of the client machine 110 or 112. The generated query may be evaluated (operation 950) to generate one or more search results. The application server 118 may transmit the generated search results to the client machine 110 or 112 (operation 960).

According to various example embodiments, one or more of the methodologies described herein may facilitate location-based and alter-ego queries. Hence, one or more the methodologies described herein may facilitate retrieval and presentation of results of interest to a user without requiring the user to explicitly craft a query.

When these effects are considered in aggregate, one or more of the methodologies described herein may obviate a need for certain efforts or resources that otherwise would be involved in searching. Efforts expended by a user in identifying relevant queries may be reduced by one or more of the methodologies described herein. Computing resources used by one or more machines, databases, or devices (e.g., within the client-server system 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs.)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
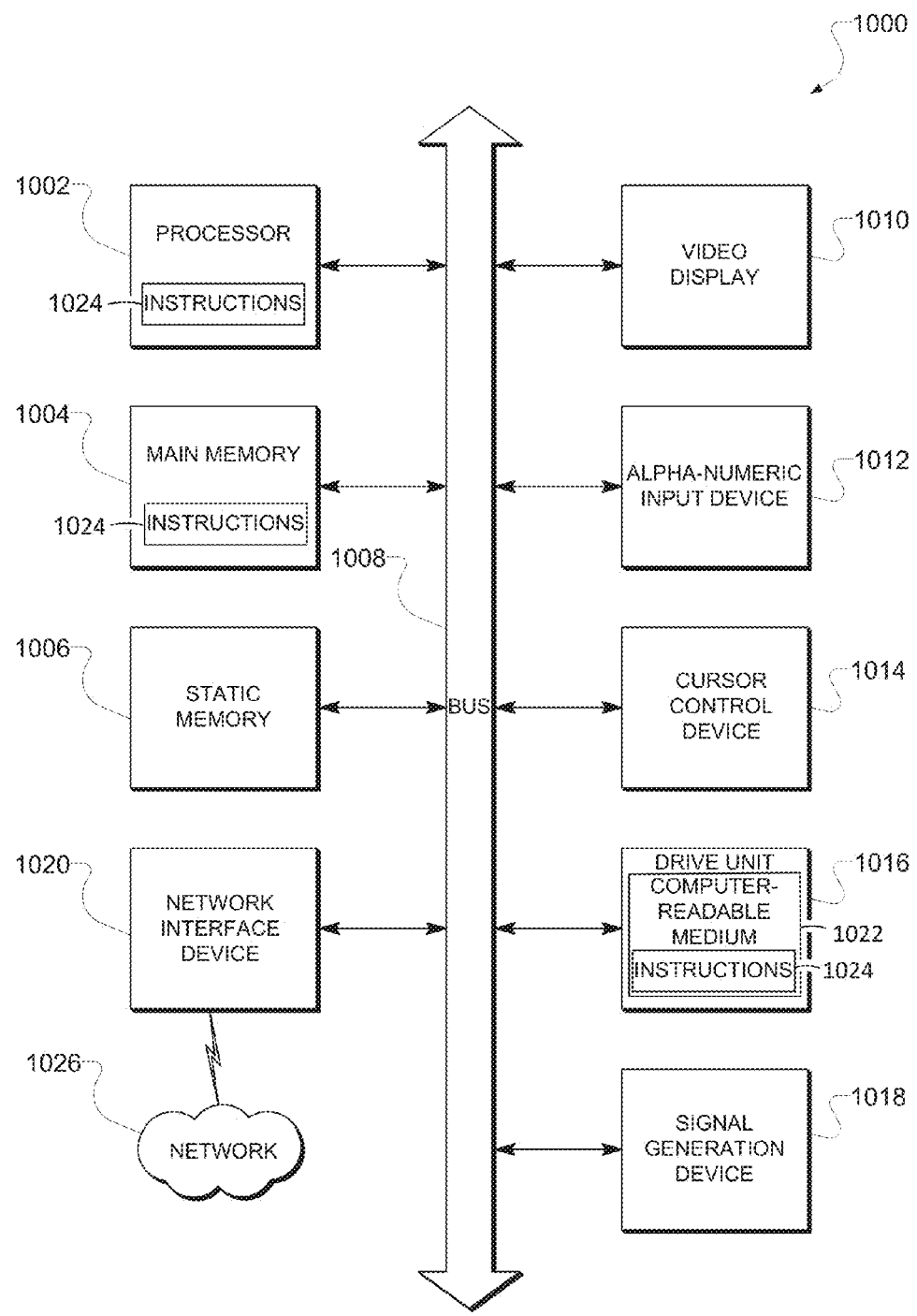
FIG. 10 is a block diagram illustrating components of a machine, according to some example embodiments, able to read instructions from a machine-readable medium and perform any one or more of the methodologies discussed herein.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Applications

Figure 11:
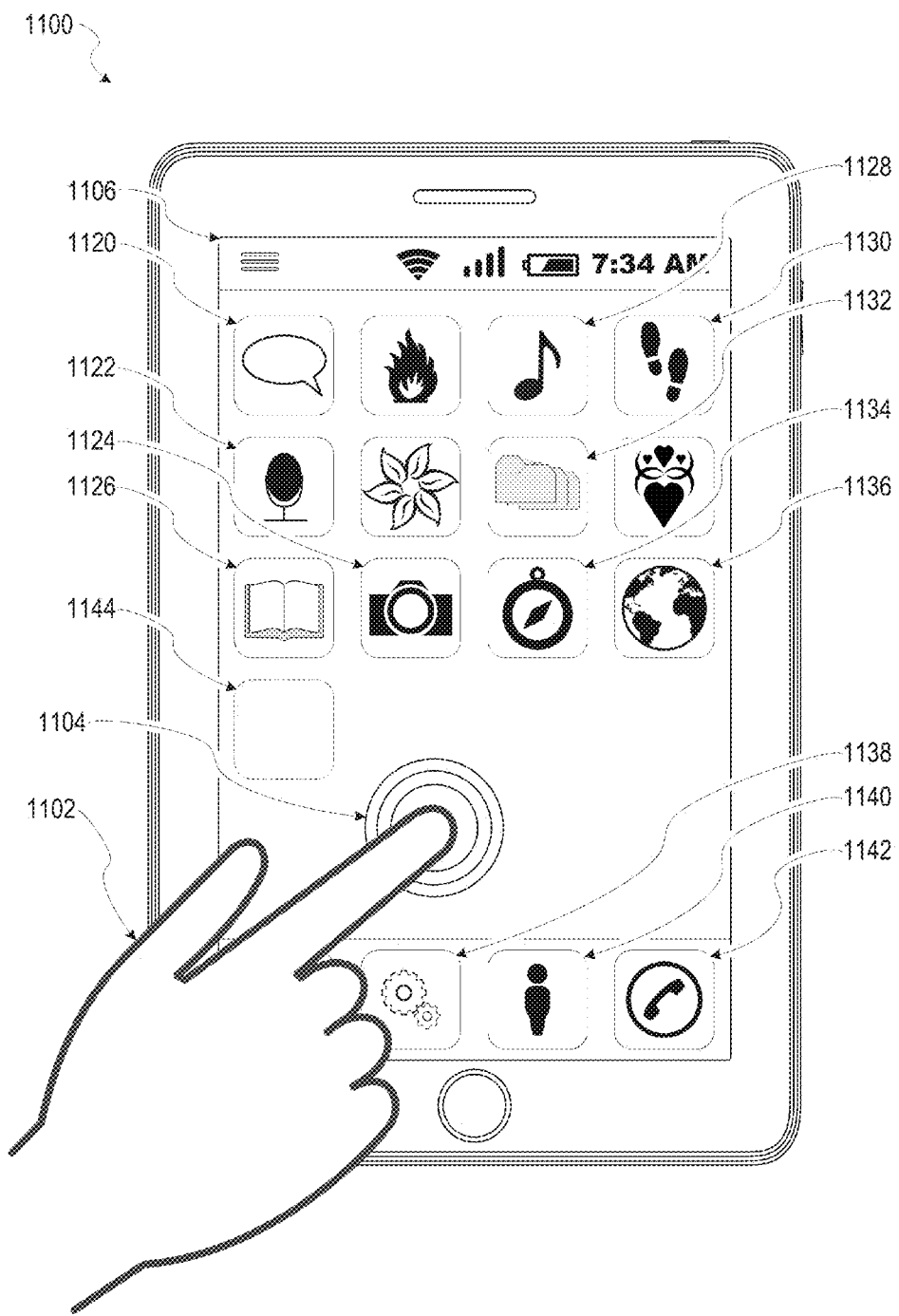
FIG. 11 depicts an example mobile device and mobile operating system interface, according to some example embodiments.

FIG. 11 illustrates an example mobile device 1100 that may be executing a mobile operating system (e.g., iOS™, Android™, Windows® Phone, or other mobile operating systems), according to example embodiments. In one embodiment, the mobile device 1100 may include a touch screen that may receive tactile information from a user 1102. For instance, the user 1102 may physically touch 1104 the mobile device 1100, and in response to the touch 1104, the mobile device 1100 may determine tactile information such as touch location, touch force, gesture motion, and so forth. In various example embodiment, the mobile device 1100 may display home screen 1106 (e.g., Springboard on iOS™) that the user 1102 of the mobile device 1100 may use to launch applications and otherwise manage the mobile device 1100. In various example embodiments, the home screen 1106 may provide status information such as battery life, connectivity, or other hardware status. The home screen 1106 may also include a plurality of icons that may be activated to launch applications, for example, by touching the area occupied by the icon. Similarly, other user interface elements may be activated by touching an area occupied by a particular user interface element. In this manner, the user 1102 may interact with the applications.

Many varieties of applications (also referred to as "apps") may be executing on the mobile device 1100. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 1100 may include a messaging app 1120, audio recording app 1122, a camera app 1124, a book reader app 1126, a media app 1128, a fitness app 1130, a file management app 1132, a location app 1134, a browser app 1136, a settings app 1138, a contacts app 1140, a telephone call app 1142, other apps (e.g., gaming apps, social networking apps, biometric monitoring apps), a third party app 1144, and so forth.

Software Architecture

Figure 12:
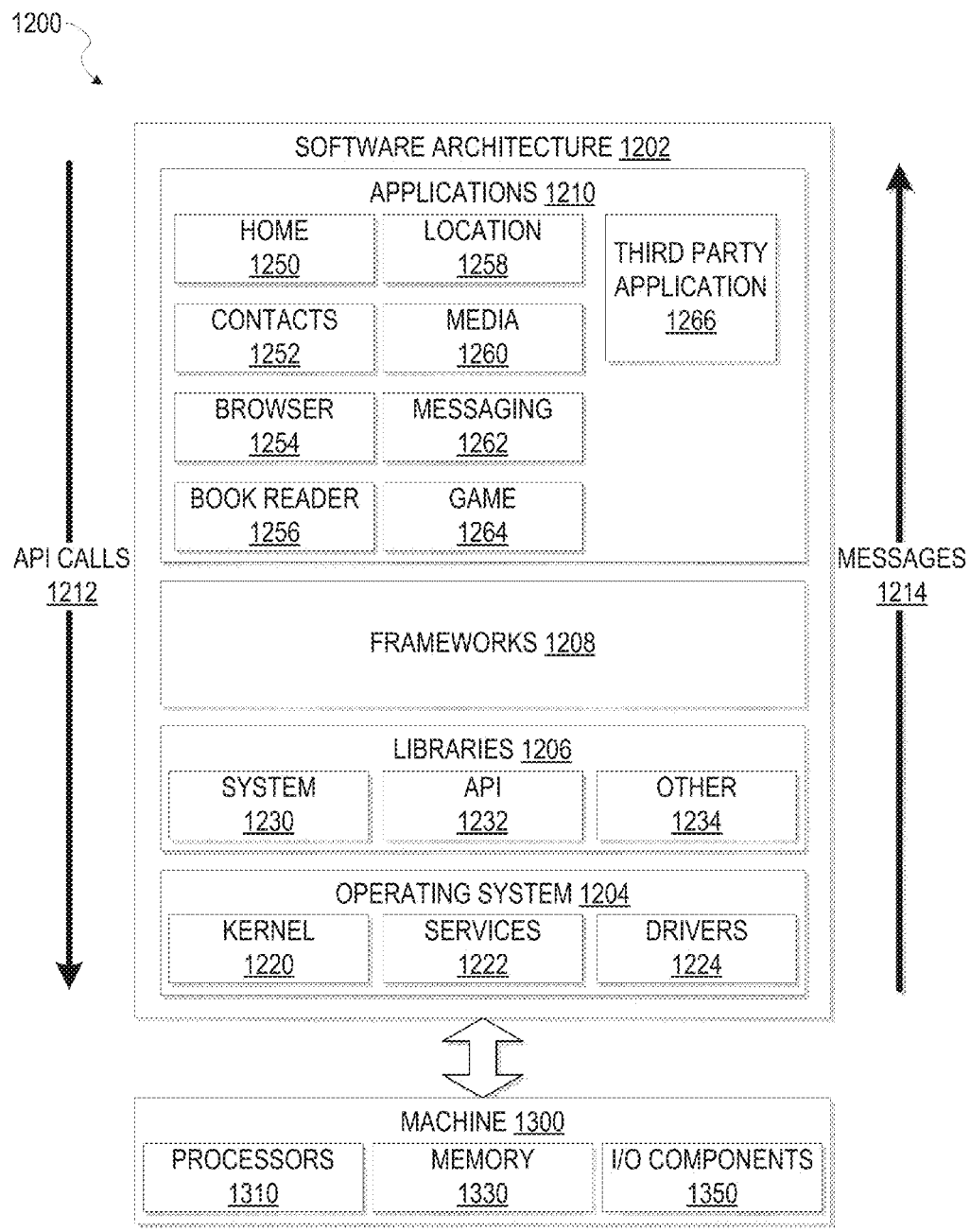
FIG. 12 is a block diagram illustrating an example of a software architecture that may be installed on a machine, according to some example embodiments.

FIG. 12 is a block diagram 1200 illustrating an architecture of software 1202, which may be installed on any one or more of devices described above. FIG. 12 is merely a non-limiting example of a software architecture and it will be appreciated that many other architectures may be implemented to facilitate the functionality described herein. The software 1202 may be executing on hardware such as machine 1300 of FIG. 13 that includes processors 1310, memory 1330, and I/O components 1350. In the example architecture of FIG. 12, the software 1202 may be conceptualized as a stack of layers where each layer may provide particular functionality. For example, the software 1202 may include layers such as an operating system 1204, libraries 1206, frameworks 1208, and applications 1210. Operationally, the applications 1210 may invoke application programming interface (API) calls 1212 through the software stack and receive messages 1214 in response to the API calls 1212.

The operating system 1204 may manage hardware resources and provide common services. The operating system 1204 may include, for example, a kernel 1220, services 1222, and drivers 1224. The kernel 1220 may act as an abstraction layer between the hardware and the other software layers. For example, the kernel 1220 may be responsible for memory management, processor management (e.g., scheduling), component management, networking, security settings, and so on. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1206 may provide a low-level common infrastructure that may be utilized by the applications 1210. The libraries 1206 may include system 1230 libraries (e.g., C standard library) that may provide functions such as memory allocation functions, string manipulation functions, mathematic functions, and the like. In addition, the libraries 1206 may include API libraries 1232 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1206 may also include a wide variety of other libraries 1234 to provide many other APIs to the applications 1210.

The frameworks 1208 may provide a high-level common infrastructure that may be utilized by the applications 1210. For example, the frameworks 1208 may provide various graphic user interface (GUI) functions, high-level resource management, high-level location services, and so forth. The frameworks 1208 may provide a broad spectrum of other APIs that may be utilized by the applications 1210, some of which may be specific to a particular operating system or platform.

The applications 1210 include a home application 1250, a contacts application 1252, a browser application 1254, a book reader application 1256, a location application 1258, a media application 1260, a messaging application 1262, a game application 1264, and a broad assortment of other applications such as third party application 1266. In a specific example, the third party application 1266 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1266 may invoke the API calls 1212 provided by the mobile operating system 1204 to facilitate functionality described herein.

Example Machine Architecture and Machine-Readable Medium

Figure 13:
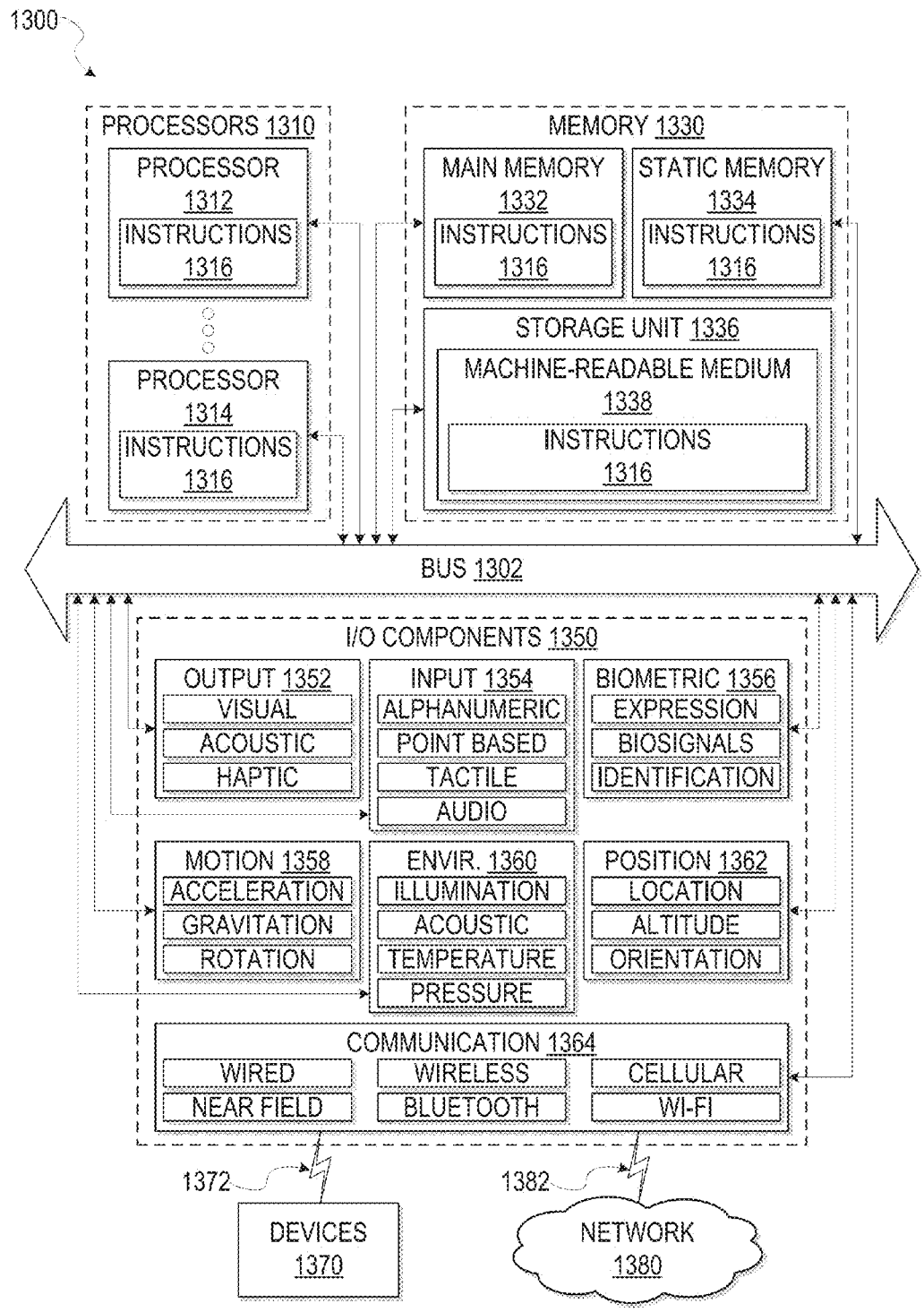
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (also referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory 1330 may include a main memory 1332, a static memory 1334, and a storage unit 1336 accessible to the processors 1310 via the bus 1302. The storage unit 1336 may include a machine-readable medium 1338 on which is stored the instructions 1316 embodying any one or more of the methodologies or functions described herein. The instructions 1316 may also reside, completely or at least partially, within the main memory 1332, within the static memory 1334, within at least one of the processors 1310 (e.g., within the processor's cache memory), or any suitable combination thereof, during execution thereof by the machine 1300. Accordingly, the main memory 1332, static memory 1334, and the processors 1310 may be considered as machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 may include a wide variety of components to receive input, provide output, produce output, transmit information, exchange information, capture measurements, and so on. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Furthermore, the machine-readable medium 1338 is non-transitory (in other words, not having any transitory signals) in that it does not embody a propagating signal. However, labeling the machine-readable medium 1338 as "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   determining a location of a client device associated with a first user;
   presenting on the client device a first user interface for selecting a criterion to localize search results;
   responsive to the client device receiving a selection of alter egos of the first user as the criterion, presenting on the client device a second user interface for selecting an alter ego from a plurality of available alter egos to determine search results relevant to the alter ego when the alter ego is located at the location of the client device, wherein one or more of the plurality of available alter egos are associated with at least a second user that is different from the first user;
   responsive to the client device receiving a selection of the second user as the alter ego, presenting on the client device a third user interface for selecting a user interest from a plurality of available user interests to determine search results relevant to the user interest;
   responsive to the client device receiving a selection of a first user interest as the user interest, generating by and transmitting from the client device a search query based on the location of the client device, the alter ego, and the first user interest; and
   responsive to the client device receiving first search results relevant to the search query, presenting on the client device a fourth user interface for interacting with the first search results.

2. The method of claim 1, wherein the alter ego is a friend of the first user on a social network.

3. The method of claim 1, wherein the plurality of available user interests include interests associated with items tagged by the alter ego.

4. The method of claim 1, wherein the first user interface comprises a plurality of buttons corresponding to the plurality of available alter egos.

5. The method of claim 1, wherein the search query is further based on a predetermined distance.

6. The method of claim 5, further comprising determining the predetermined distance based on user information.

7. The method of claim 1, wherein the alter ego is a group to which the second user belongs.

8. The method of claim 7, wherein the plurality of available user interests are determined based on votes from members of the group.

9. The method of claim 7, wherein the group is determined based on at least one of an interest, an age, a gender, an income level, or an education level.

10. The method of claim 9, wherein the plurality of available user interests are determined based on items liked by a user.

11. A system, comprising:
    at least one processor; and
    memory including instructions that, when executed by the at least one processor, cause the system to perform operations comprising:
    determining a location of a first user;
    presenting a first user interface for selecting a criterion to localize search results;
    responsive to receiving a selection of alter egos of the first user as the criterion, presenting a second user interface for selecting an alter ego from a plurality of available alter egos to determine search results relevant to the alter ego when the alter ego is located at the location of the first user, wherein one or more of the plurality of available alter egos are associated with a second user that is different from the first user;
    responsive to receiving a selection of the second user as the alter ego, presenting a third user interface for selecting a user interest from a plurality of available user interests to determine search results relevant to the user interest;
    responsive to receiving a selection of a first user interest as the user interest, generating and transmitting a search query based on the location of the first user, the alter ego, and the first user interest; and
    in response to receiving first search results relevant to the search query, presenting a fourth user interface for interacting with the first search results.

12. The system of claim 11, wherein the alter ego is a friend of the first user on a social network.

13. The system of claim 11, wherein the plurality of available user interests include interests associated with items tagged by the alter ego.

14. The system of claim 11, wherein the search query is further based on a predetermined distance.

15. The system of claim 14, wherein the operations further comprise determining the predetermined distance based on user information.

16. The system of claim 11, wherein the alter ego is a group to which the second user belongs.

17. A non-transitory machine-readable storage medium comprising instructions that, when executed by one or more processors of a system, cause the system to perform operations comprising:
    determining a location of a first user;
    presenting a first user interface for selecting one or more criteria to localize search results;
    responsive to receiving a selection of alter egos of the first user as the one or more criteria, presenting a second user interface for selecting one or more alter egos from a plurality of available alter egos to determine search results relevant to the one or more alter egos when the one or more alter egos are located at the location of the first user, wherein one or more of the plurality of available alter egos are associated with a second user that is different from the first user;
    responsive to receiving a selection of the second user as the alter ego, presenting a third user interface for selecting a user interest from a plurality of available user interests to determine search results relevant to the user interest;
    responsive to receiving a selection of a first user interest as the user interest, generating and transmitting a search query based on the location of the first user, the alter ego, and the first user interest; and
    in response to receiving first search results relevant to the search query, presenting a fourth user interface for interacting with the first search results.

18. The non-transitory machine-readable storage medium of claim 17, wherein the first user interface comprises a plurality of buttons corresponding to the plurality of available alter egos.

19. The non-transitory machine-readable storage medium of claim 17, wherein the alter ego is a group to which the second user belongs, and wherein the group is determined based on at least one of an interest, an age, a gender, an income level, or an education level.

20. The non-transitory machine-readable storage medium of claim 19, wherein the plurality of available user interests are determined based on items liked by a user.

* * * * *